United States Patent
Murphy et al.

(10) Patent No.: US 6,229,809 B1
(45) Date of Patent: May 8, 2001

(54) METHOD AND SYSTEM FOR COMBINING COMPUTER NETWORK PROTOCOLS

(75) Inventors: David Murphy, Herriman; Kyle Unice, Sandy, both of UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 08/948,934

(22) Filed: Oct. 10, 1997

(Under 37 CFR 1.47)

Related U.S. Application Data
(60) Provisional application No. 60/028,362, filed on Oct. 11, 1996.

(51) Int. Cl.$^7$ .................................................. H04L 12/56
(52) U.S. Cl. ........................... 370/401; 370/466; 370/469
(58) Field of Search .................................. 370/465, 466, 370/467, 469, 401, 402; 709/227, 228, 229, 230

(56) References Cited

U.S. PATENT DOCUMENTS

| | | | |
|---|---|---|---|
| 5,073,852 | 12/1991 | Siegel et al. | 395/700 |
| 5,136,716 | 8/1992 | Harvey et al. | 395/800 |
| 5,142,622 | 8/1992 | Owens | 395/200 |
| 5,224,098 | 6/1993 | Bird et al. | 370/94.1 |
| 5,307,413 | * 4/1994 | Denzer | 370/473 |
| 5,325,362 | 6/1994 | Aziz | 370/94.3 |
| 5,423,002 | 6/1995 | Hart | 395/200 |
| 5,430,727 | 7/1995 | Callon | 370/85.13 |
| 5,446,736 | 8/1995 | Gleeson et al. | 370/85.13 |
| 5,452,287 | 9/1995 | DiCecco et al. | 370/17 |
| 5,485,460 | 1/1996 | Schrier et al. | 370/94.1 |
| 5,491,693 | 2/1996 | Britton et al. | 370/85.13 |
| 5,517,564 | 5/1996 | Slater et al. | 379/229 |
| 5,537,417 | 7/1996 | Sharma et al. | 370/94.1 |
| 5,548,646 | 8/1996 | Aziz et al. | 380/23 |
| 5,548,723 | 8/1996 | Pettus | 395/200.01 |
| 5,548,727 | 8/1996 | Meehan | 395/200.13 |
| 5,550,914 | 8/1996 | Clarke et al. | 379/230 |
| 5,778,189 | * 7/1998 | Kimura et al. | 709/236 |
| 6,006,090 | * 12/1999 | Coleman et al. | 455/432 |
| 6,064,671 | * 5/2000 | Killian | 370/389 |

OTHER PUBLICATIONS

Pozefsky et al., "Multiprotocol Transport Networking: Eliminating application dependencies on communications protocols", IBM Systems Journal, vol. 34, No. 3, 1995, pp. 472–500.

Ferrer et al., "Gift: A Multiple Gateway for File Transfer, Access, and Management", IEEE Journal on Selected Areas in Communications, vol. 8. No. 1, Jan. 1990, pp. 99–106.

O'Malley et al., "A Dynamic Network Architecture", ACM Transactions on Computer Systems, vol. 10 No. 2, May 1992, pp. 110–143.

Hess et al., "Multiprotocol networking—a blueprint", IBM Systems Journal, vol. 34, No. 3, 1995, pp. 330–346.

Gayek, "Data link switching: Present and future", IBM Systems Journal, vol. 34, No. 3, 1995, pp. 409–429.

Bird et al., "Advances in APPN architecture", IBM Systems Journal, vol. 34, No. 3, 1995, pp. 430–451.

(List continued on next page.)

Primary Examiner—Chau Nguyen
Assistant Examiner—Soon-Dong Hyun
(74) Attorney, Agent, or Firm—Computer Law$^{++}$

(57) ABSTRACT

Methods and systems are provided for combining previously incompatible network protocols without tunneling. In one system, an Internet Protocol ("IP") stack is modified to include an IP-compatible datagram component IP' which registers a transfer function with an Open Data Interface ("ODI") component. A NetWare Core Protocol ("NCP") stack is similarly modified to include an NCP-compatible component NCP' which utilizes the registered transfer function. The modified protocol stacks provide IP-compatible connectivity for NCP services without continually converting packets between formats in the manner required by protocol tunneling systems.

20 Claims, 3 Drawing Sheets

OTHER PUBLICATIONS

Clark et al., "Multi–Protocol Architectures as a Paradigm for Achieving Inter–Operability", IEEE, 1993, pp. 136–143.

Bierer et al., NetWare 4 for Professionals, 1993, pp. 3–54, 820–826.

Tanenbaum, Computer Networks, 1996, pp. 45–47.

Novell Marketing Brief, Sep. 1996 (2 pages).

Miscellaneous Abstracts, no later than Dec. 5, 1996, pp. 8–16.

Merkey, BrainShare '97 (1–33).

Murphy, BrainShare '97 (1–21).

* cited by examiner

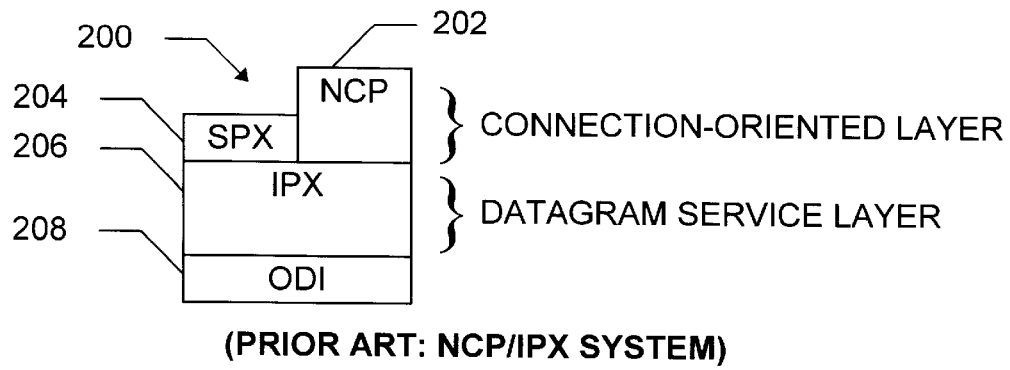
FIG. 2 (PRIOR ART: NCP/IPX SYSTEM)
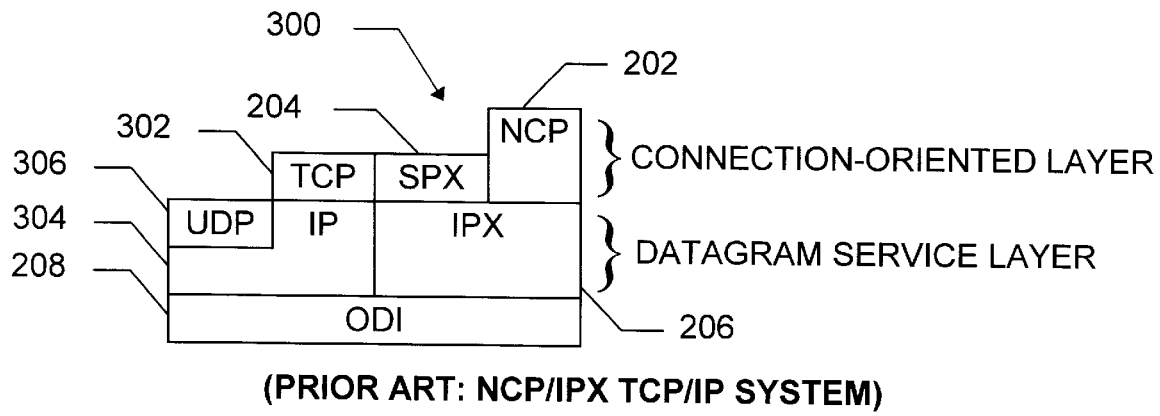
FIG. 3 (PRIOR ART: NCP/IPX TCP/IP SYSTEM)
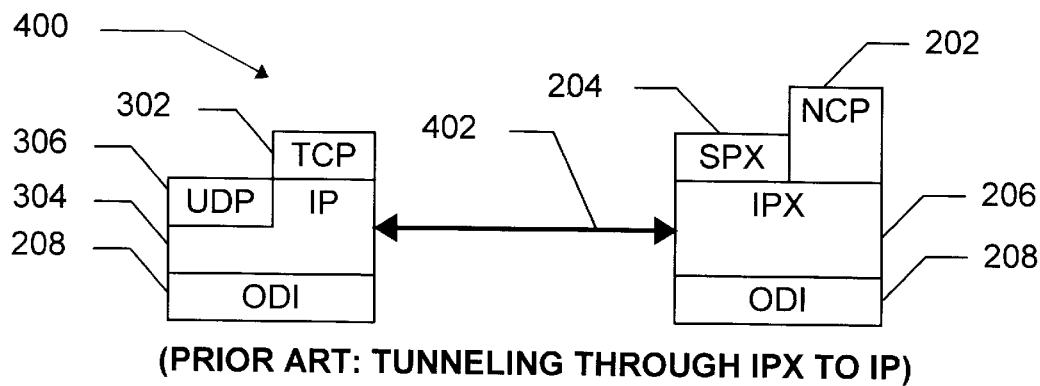
FIG. 4 (PRIOR ART: TUNNELING THROUGH IPX TO IP)

(PRIOR ART: ETHERNET PACKET CREATED BY TUNNELING)

METHOD AND SYSTEM FOR COMBINING COMPUTER NETWORK PROTOCOLS

RELATED APPLICATIONS

This application is based on U.S. Provisional Patent Application Ser. No. 60/028,362 filed Oct. 11, 1996.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The copy-right owner does not hereby waive any of its rights to have this patent document maintained in secrecy, including without limitation its rights pursuant to 37 C.F.R. §1.14.

FIELD OF THE INVENTION

The present invention relates to computer networking protocols generally, and more particularly to methods and systems for combining previously incompatible protocols so that each runs in native format without tunneling.

TECHNICAL BACKGROUND OF THE INVENTION

Computer networking is accomplished using components which include a set of networking protocols. A wide variety of protocols are known, and not all combinations of protocols are compatible with one another. Familiar protocols include the Transmission Control Protocol ("TCP"), the Internet Protocol ("IP"), the NetWare Core Protocol ("NCP") (NETWARE is a trademark of Novell, Inc.), the User Datagram Protocol ("UDP"), the Sequenced Packet Exchange protocol ("SPX"), the Internetwork Packet Exchange protocol ("IPX"), and many others.

Protocol stack components interface with one another through the exchange of data packets and other data/control structures such as event control blocks ("ECBs"), and through calls to one another's routines. ECBs are described in "ODI Specification Protocol: Stacks and MLIDs (C Language)," which is commercially available from Novell, Inc. of Orem, Utah. Protocol incompatibilities manifest themselves as a lack of space, encoding differences, or a difference in functionality in the structures and/or routines that are available for one protocol to communicate with another protocol. For instance, IPX packets use 10-byte source and destination addresses while the IP packet format only allocates 4-byte addresses. Thus, full IPX addresses are incompatible with IP addresses.

Such incompatibilities limit the availability of protocol functionality. For instance, NCP defines a wide variety of routines for using and managing information in networks, including file system services, directory services, printing services, and security services. But these services rely on lower-level services provided by IPX. Thus, network users whose system does not support IPX generally do not have access to NCP services. Stated differently, NCP and IP are incompatible in conventional systems (as are SPX and IP, NCP and UDP, SPX and UDP, and TCP and IPX).

"Tunneling" is a process which links otherwise incompatible protocols by continually encapsulating structures used by one protocol into (more or less) equivalent structures used by another protocol. However, this encapsulation process adds significant overhead to the network and also introduces the risk that information will be lost or corrupted by improper encapsulation or decapsulation.

To illustrate tunneling, consider first a conventional system, containing no tunneling, in which an NCP service calls an IPX service. The system does not use IP or any other alternative to IPX, but instead relies on IPX. After receiving information from the NCP protocol, the IPX protocol would call lower level protocols to transmit information over a "wire"; as used herein, "wires" include one or more links such as copper wire, cable, optical fibers, microwave transceivers, satellites, and other transmission media. At the other end of the wire, a second instance of IPX would receive the information and pass it upward in turn to a second instance of NCP.

Now assume that transmission over the wire is to be accomplished using IP. In a tunneling system, both IP and IPX are used, even though IP and IPX duplicate much of each other's functionality from a network architecture point of view. The first NCP instance hands information to the first IPX instance, as before. However, in the tunneling system the first IPX instance has been modified so that it calls an encapsulation routine from an encapsulation module instead of calling the lower level protocols. The encapsulation routine encapsulates the information, which is in IPX format, creating a packet that fits IP format and then calls IP (hence "tunneling" into IP through IPX). IP transmits the information over the wire (with the assistance of lower level protocols as is usual for IP) to a second IP instance. The second IP instance hands the received information to a second conversion module. The conversion module converts the information back into IPX format and passes it to a second instance of IPX. Finally, the second IPX instance passes the information up to a second instance of NCP.

In view of the inefficiencies and risks of tunneling and the benefits of connectivity, it would be an advancement in the art to provide a system and method for placing otherwise incompatible network protocols in communication with one another without tunneling through one protocol into another protocol that duplicates much of the first protocol's network functionality.

It would be an additional advancement to provide such a system and method which reduces or eliminates the use of conversion routines.

It would also be an advancement to provide such a system and method which do not require changes in packet formats or other data/control structures that are already in wide use by numerous individuals and institutions.

Such a method and system for combining network protocols is disclosed herein.

BRIEF SUMMARY OF THE INVENTION

The present invention provides a method and system for combining previously incompatible network protocols without tunneling. In one embodiment of the invention, an IP stack is modified to contain an IP-compatible component IP' which registers a predetermined and relatively small set of identifiers and service routines with a Link Support Layer ("LSL") in an Open Data Interface ("ODI") component. An NCP stack is similarly modified to include an NCP-compatible component NCP' which utilizes the registered identifiers and routines. The ODI component underlies both IP' and NCP' and performs low-level services such as transport of data packets over the wire.

In this embodiment, no version of IPX is required (although IP, IP', and IPX can run concurrently or in turns on the same system if desired, with each handling their respective network connections). A registered transport function replaces a corresponding transport function of IP. Thus, a system of the present invention may operate in the following manner:

(a) an IP' protocol stack is provided at a source, and a second IP' stack is provided at a destination;

(b) NCP' protocol stacks are provided at the source and destination;

(c) each IP' registers a transport function with an ODI component;

(d) each NCP' obtains the address of the registered transport function so it can call the registered function directly;

(e) an application or other entity at the source requests an NCP' service (the service is preferably identical with the corresponding NCP service, at least from the point of view of applications and users);

(f) in the course of servicing the request, the source NCP' invokes the registered transport function (rather than calling an IPX transport function, as NCP would in a conventional system without IP or in a tunneling system which uses both IP and IPX);

(g) the source IP' uses the registered transport routine in place of the corresponding transport routine that would be used by IP, manipulates the data appropriately, and passes the data over the wire to the destination IP' using ODI or other low-level support as needed; and (h) at the destination, the process is reversed, with IP' passing data to NCP' using the registered transport function.

The features and advantages of the present invention will become more fully apparent through the following description.

BRIEF DESCRIPTION OF THE DRAWINGS

To illustrate the manner in which the advantages and features of the invention are obtained, a more particular description of the invention summarized above will be given with reference to the attached drawings. These drawings only provide selected embodiments of the invention and are not therefore to be considered limiting of its scope. In the drawings:

FIG. 2 is a diagram illustrating the network architecture of a conventional NCP/IPX system. Components closer to the user appear near the top of the diagram, while those closer to the wire appear near the bottom of the diagram.

FIG. 3 is a diagram illustrating the network architecture of a conventional system running NCP/IPX and TCP/IP.

FIG. 4 is a diagram illustrating the network architecture of a system which employs conversion routines to tunnel through IPX to IP.

DETAILED DESCRIPTION OF THE PREFERRED EMBODIMENTS

The present invention relates to a method and apparatus for combining previously incompatible computer network protocols such as NCP and IP, or other previously incompatible groups of protocols, without tunneling. The network protocols are suitable for use on a computer network. The computers on the network may be workstations, laptop computers, disconnectable mobile computers, file servers, or a combination thereof. The network may include one or more LANs, wide-area networks, Internet servers and clients, peers, or a combination thereof.

Figure 1:
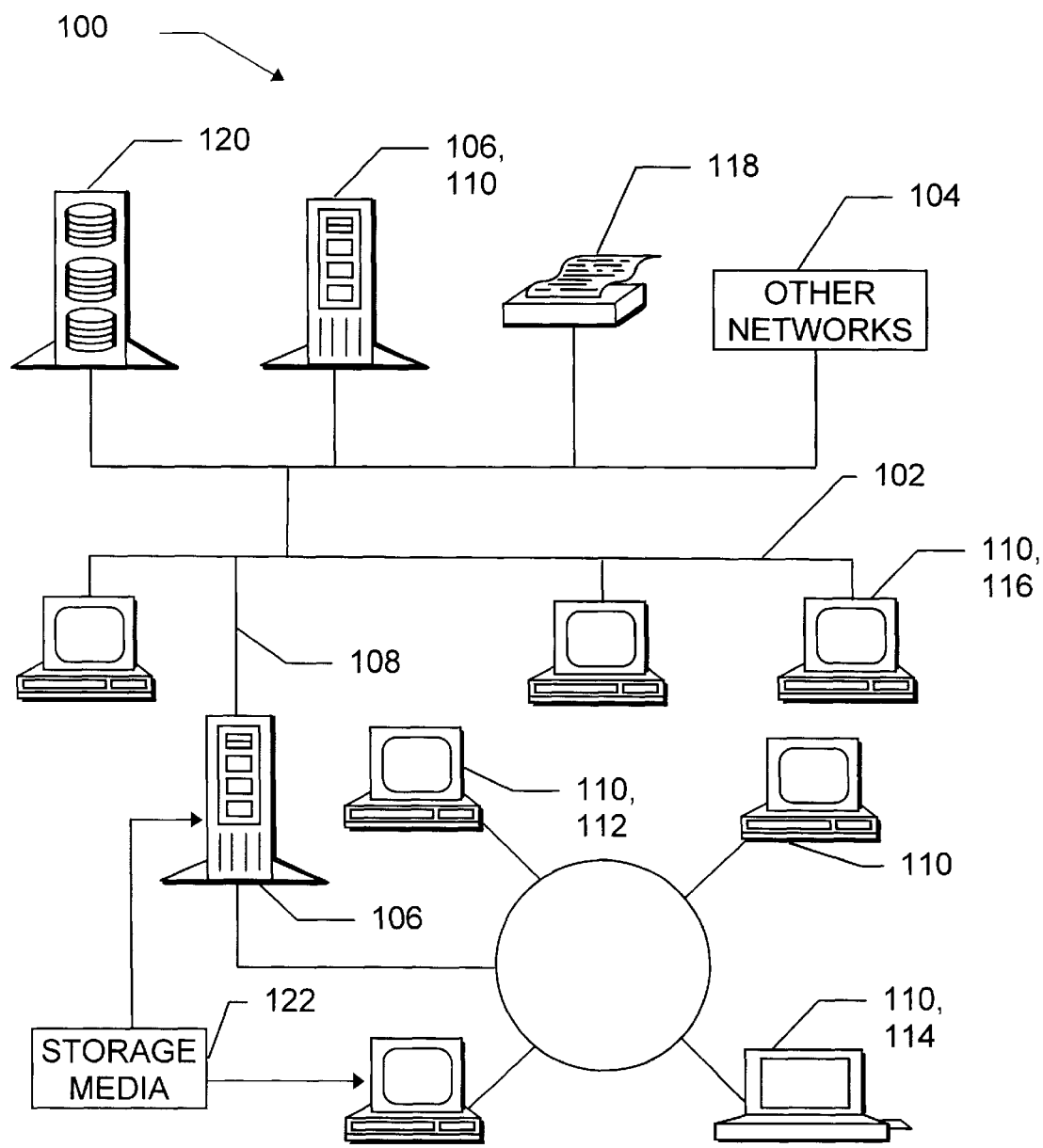
FIG. 1 is a diagram illustrating a computer network suitable for use with the present invention.

One of the many computer networks suited for use with the present invention is indicated generally at 100 in FIG. 1. In one embodiment, the network 100 includes Novell NetWare® network operating system software (NETWARE is a registered trademark of Novell, Inc.). In alternative embodiments, the network 100 includes NetWare Connect Services, VINES, Windows NT, LAN Manager, or LANtastic network operating system software (VINES is a trademark of Banyan Systems; NT and LAN MANAGER are trademarks of Microsoft Corporation; LANTASTIC is a trademark of Artisoft). The network 100 may include a local area network 102 which is connectable to other networks 104, including other LANs or portions of the Internet, through a gateway or similar mechanism. "Internet" as used herein includes variations such as a private Internet, a secure Internet, a value-added network, a virtual private network, an extranet, or an intranet.

The network 100 includes several servers 106 that are connected by network signal lines 108 to one or more network clients 110. The servers 106 and the network clients 110 may be configured by those of skill in the art in a wide variety of ways to operate according to the present invention. The servers 106 may be configured as file servers, as Internet servers, as directory services providers, as software component servers, or as a combination thereof. The servers 106 and clients 110 may be uniprocessor or multiprocessor machines.

Suitable network clients 110 include, without limitation, personal computers 112, laptops 114, and workstations 116. The signal lines 108 may include twisted pair, coaxial, or optical fiber cables, telephone lines, satellites, microwave relays, modulated AC power lines, and other data transmission "wires" known to those of skill in the art. In addition to the network client computers 110, a printer 118 and an array of disks 120 are also attached to the network 100. Although particular individual and network computer systems and components are shown, those of skill in the art will appreciate that the present invention also works with a variety of other networks and computers.

The servers 106 and the network clients 110 are capable of using floppy drives, tape drives, optical drives or other means to read a storage medium 122. A suitable storage medium 122 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system 100 to operate in a specific and predefined manner as described herein. Thus, the medium 122 tangibly embodies a program, functions, and/or instructions that are executable by the servers 106 and/or network client computers 110 to perform network protocol interface and usage steps of the present invention substantially as described herein.

To better illustrate the invention, conventional systems are shown in FIGS. 2 through 4. Such systems either lack functionality provided by the present invention or introduce inefficiencies by utilizing steps or structures not required by the present invention. For instance, the system 200 shown in FIG. 2 includes an NCP protocol component 202, and an SPX protocol component 204 on top of an IPX protocol component 206, which in turn interfaces with an Open Datalink Interface component 208. The system 200 does not provide NCP component 202 functionality to users whose connectivity relies on IP connectivity because IP is not supported. In particular, machines which are connected only over the Internet cannot access and manage each other's resources using NCP components 202 when those machines have the network architecture shown in FIG. 2.

FIG. 3 shows a system 300 which includes the system 200 plus an additional protocol stack comprising a TCP protocol component 302, an IP protocol component 304, and an optional UDP protocol component 306. However, simply adding the TCP/IP protocol stack does not solve the problem. Machines which have the architecture shown in FIG. 3 can communicate with one another over the Internet using their respective TCP/IP stacks, but still cannot access and manage each other's resources using their NCP components 202. Only when connectivity is provided by the IPX component 206 can two such machines employ NCP services.

Two machines in a system 400 which have the architecture shown in FIG. 4 can utilize Internet IP connectivity to support NCP services with respect to one another, but only by continually converting between IPX and IP using a conversion component 402. Reliance on this conversion module 402 decreases efficiency and increases the risk to data. Each act of conversion 402 requires time, processing power, and memory, and occurs at both the source and destination.

Figure 7:
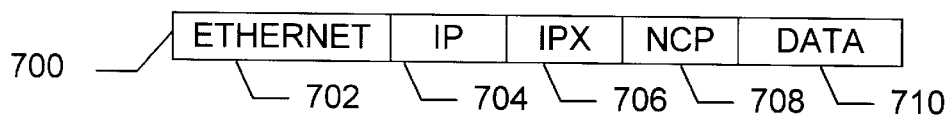
FIG. 7 is a diagram illustrating the data and header portions of an Ethernet packet created in a system which tunnels through IPX to IP.
Figure 8:
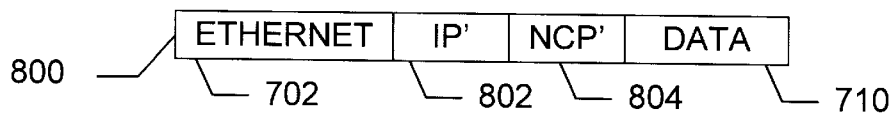
FIG. 8 is a diagram illustrating the data and header portions of an Ethernet packet created in a system according to the present invention.

FIGS. 7 and 8 illustrate another aspect of the inefficiency by contrasting the extra headers created when tunneling with the lack of such headers when the present invention is used. FIG. 7 shows an Ethernet packet 700 created in a system such as that shown in FIG. 4. The packet 700 contains a Ethernet header 702, an IP header 704, an IPX header 706, and NCP header 708, and a data portion 710. For clarity, only headers are shown in the Figures, but those of skill in the art will understand that data packets may also contain corresponding trailers. Both the IP header 704 and the IPX header 706 are needed, even though IP and IPX are both datagram services, because the system tunnels through IPX to IP.

Figure 6:
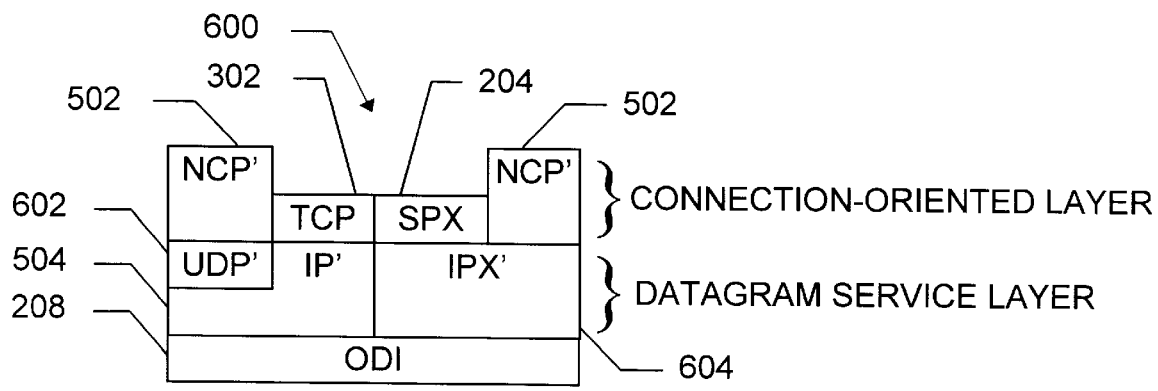
FIG. 6 is a diagram illustrating the network architecture of a system according to the present invention which includes an NCP'/IP' protocol stack in combination with NCP'/IPX' and TCP/IP' protocol stacks.

FIG. 8 illustrates an Ethernet packet 800 created in a system according to the present invention, such as the system 600 in FIG. 6. The packet 800 still contains the Ethernet header 702 and the data 710. But instead of the three headers 704, 706, and 708 for IP, IPX, and NCP, respectively, the packet 800 contains only two headers: an IP' header 802 and an NCP' header 804. Advantageously, unlike the packet 700 the packet 800 requires only one datagram service layer header.

The two headers 802, 804 have the same format as headers used in conventional systems such as the systems shown in FIGS. 2 and 3, but may be modified according to the teachings of the present invention. In one embodiment, the packet headers 802, 804 have the same offsets for all fields, and the same field contents for all fields, as the conventional headers 704, 708. In another embodiment, the packet headers 802, 804 have the same offsets for all fields, and the same field contents for almost all fields, as the conventional headers 704, 708, with the difference being that one or more identifiers (such as a socket number, port number, address, connection identifier, or protocol identifier) in the packet 800 contains a value that is recognized as valid only in systems configured according to the invention.

Figure 5:
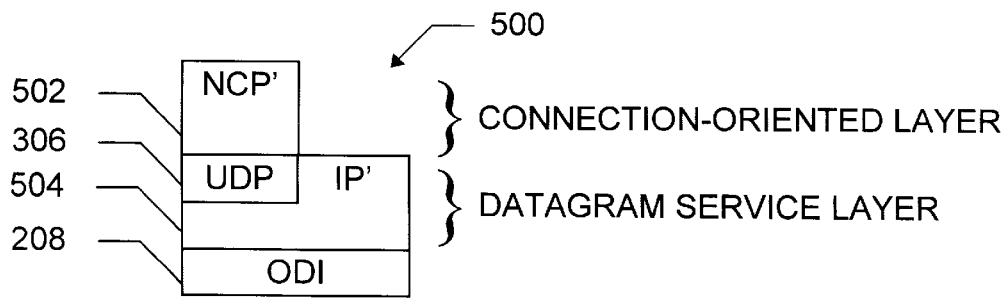
FIG. 5 is a diagram illustrating the network architecture of a system according to the present invention which includes an NCP'/IP' protocol stack.

Embodiments 500, 600 of the present invention are further illustrated in FIGS. 5 and 6. Machines thus configured may be servers, clients, or both. These embodiments allow NCP's functionality, in the form of NCP' components 502, to run in any protocol stack which provides datagram services, such as a stack that includes the IP-compatible IP' component 504. The NCP' component 502 is preferably implemented in a manner making it compatible with the IPX component 206, with an IPX-compatible IPX' component 604, with a UDP-compatible UDP' component 602, and/or with IP' component 504. The IPX' component 604 is preferably compatible with the SPX component 204, and the IP' component 504 is preferably compatible with the TCP component 302.

NCP has few requirements from the protocol stack and if these functional requirements are met it can be run over any protocol stack. These requirements are:

1. datagram service;
2. identification of the maximum amount of data that can be sent in one datagram on the wire; and
3. suitable receive and transmit Application Program Interfaces ("APIs").

In order to access the datagram service layers that the NCP' component 502 will run over, such as the IP' and UDP' components 504, 602, a registration mechanism is provided. The mechanism allows access to a given datagram service transport layer independently of alternatives to that layer (e.g., access to IP regardless of whether IPX is present).

One method of the present invention locates protocol stack configurations through the Link Support Layer ("LSL") of the ODI component 208. Although some datagram service layers might not register with the LSL, the IPX and IP protocol stacks normally do register, so they can be used as alternatives to one another according to the present invention, without tunneling. Other protocols can also be made interchangeable by designing a registration process for their datagram service layers with the underlying protocol stacks and then making that information available to the previously incompatible higher layers.

In one embodiment, the following structure "abstracts" the IP/IPX datagram service layer for use by the NCP' component 502:

```
typedef struct        ¯PROTOCOL__SWITCH_   {
    PROT ID           *PSw__dgserviceID;
    PSWSTAT           (*PSW__tx__func) (ECB *pEcb);
    PSWSTAT           (*PSw__tx__delay__func) (ECB *pEcb);
    PSWSTAT           (*PSW__raw__tx func) (ECB *pEcb);
    PSWSTAT           (*PSw__app__skt__reg)
    (UINT32           *sktnumber,
    struct ResourceTagStructure *RTag,
    void              (*app__skt__callback) (ECB *pEcb);
    PSWSTAT           (*PSw__app__skt__dereg) (UINT32    *sktnumber);
    PSWSTAT           (*PSw__queue__resource) (ECB *pEcb);
```

-continued

```
    INFO_BLOCK *PSw_ioctl;
    PROTOCOL_SWITCH;
``` with additional functionality including the following:

```
//PSWSTAT is ENUM of possible correct and error return codes from
//protocol switch structure functions.
typedef enum _PSWSTAT_ {
    PSWSTAT_SUCCESFULL           = 0,
    PSWSTAT_BAD_COMMAND          = -127,
    PSWSTAT_BAD_PARAMETER        = -126,
    PSWSTAT_DUPLICATE_ENTRY      = -125,
    PSWSTAT_FAIL                 = -124,
    PSWSTAT_ITEM_NOT_PRESENT     = -123
PSWSTAT;
PSw_dgserviceID
    Datagram service layer identifier, matches identifier
    used by datagram service layer to identify itself to
    underlying protocol stack and the underlying protocol
    stack's type in the form <yyyy xxxx xxxx> where <yyyy>
    is the protocol identifier and <xxxxx xxxx> is the
    datagram service layer identifier (in hexadecimal),
        e.g.   SPX over IPX   8137 0000 0005
               UDP over IP    0800 0000 0011
                              (IP Next Header value of 11
                              for UDP)
    Note, where the datagram service identifier is zero,
    PSw_dgserviceID refers to the underlying protocol
    stack, e.g. <8137 0000 0000> refers to the protocol IPX
    only.
PSWSTAT    (*PSW_tx_func) (ECB *pEcb);
           where pEcb is an Event Control Block ("ECB") to
           transmit immediately.
PSWSTAT    (*PSW_tx_delay_func) (ECB *pEcb);
           where pEcb is an ECB to transmit with delay, e.g. hold
           the send for possible later sequential packets.
PSWSTAT    (*PSW_raw_tx_func) (ECB *pEcb);
           Where pEcb is an ECB to transmit immediately which has
           had all fields that would normally have been set by the
           protocol already set. i.e. everything already formed
           and ready to be transmitted via the Link Support Layer.
PSWSTAT    (*PSw_app_skt_reg) (UINT32     *sktnumber,
                               void       (*app_skt_callback)
                                          (ECB *pEcb);
           where
           sktnumber is a pointer to the socket number to
           register. Note that "socket" means the identifier used
           for transmission and reception of packets, which is
           called a "socket number" according to IPX terminology
           and a "port number" according to UDP terminology.
           Rtag is a pointer to a Resource Tag structure to track
           resources used.
           app_skt_callback is a call_back function for specified
           pEcb.
           This function registers an application distinguishing a
           routable entity with the protocol stack, e.g. socket.
PSWSTAT    (*PSw_app_skt_dereg) (UINT32 *sktnumber);
           where sktnumber    is a pointer to the socket number
                              to deregister.
           This function deregisters an application distinguishing a
           routable entity with the protocol stack, e.g. socket.
PSWSTAT    (*p5w_queue_resource) (ECB *pEcb)
           where pEcb pointer to an ECB to register for application
           route entity.
           This function registers a resource per application route
           entity, e.g. post listen ECB on a socket basis.
INFO_BLOCK    *PSW_ioctl;
           where PSw_ioctl is a pointer to an INFO BLOCK.
           This function is used to obtain an INFO_BLOCK which
           allows for access to control information from the datagram
           service layer.
           INFO_BLOCK = PSw_LayerControlInfoBlock =
               { PSw_NUM_API,
                 void (**) (void**)) &PSwAPI_Array
               };
```

```
           where    void (*PSwAPI_Array[]) =
                    {
                        (void (*) (void)) PSw_GetMaXTSDU
                    };
           #define PSw_NUM_API 1 /* currently only 1 IOCtl */
PSWSTAT    PSw_GetMaxTSDU    (UINT32    BoardNumber,
                              UINT32    *Size,
                              PROT_ID   *dgserviceID);
Input:     BoardNumber
           Board number that the datagram service layer
           is using.
           dgserviceID
           pointer to a datagram service layer
           identifier, matches identifier used by
           datagram service layer to identify itself to
           underlying protocol stack.
Output:    Size
           pointer to buffer to return maximum size of
           data that may be sent atomically using the
           underlying Protocol layer.
Return:    PSWSTAT
Remarks
Obtains the maximum size of data that may be sent atomically
using the underlying Protocol layer with the specified
board.
```

The various datagram service layers operating on top of a protocol stack may be found by querying the protocol stack's IOCt1 ProtocolManagement function with a Management ECB whose ECB_protocolID field contains the <GETDSL> value (Get Datagram Service Layers). The information returned in the Management ECB files is as follows:

| ECB_Status | |
|---|---|
| ODISTAT_SUCCESSFUL | Buffer contains information requested. |
| ODISTAT_OUT_OF_RESOURCES | Buffer provided in ECB is insufficient to return information. ECB Field ECB_DataLength contains size required to return information desired. |
| ECB_DataLength | Number of bytes of information copied into buffer if successful, otherwise zero. If the value ODISTAT_OUT_OF_RESOURCES is returned, the field contains the size of buffer required to return information desired. |
| ECBFragment[0].FragmentAddress | pointer to buffer containing datagram service layer information if successful. |

The format of information contained in the ECBFragment buffer after a successful call to obtain a Protocol Stack Datagram Service Layer Informational Element is:

```
typedef struct _PS_TL_INFO_ELEMENT_ {
    MEON_STRING         *PS_TL_Info_Name;
    PROTOCOL_SWITCH     *PS_TL_Info_Switch;
} PS_TL_INFO_ELEMENT;
where
    PS_TL_Info_Name
        pointer to MEON_STRING (ASCIIZ) containing name of
        datagram service layer, e.g. TCP.
```

```
                            -continued

PS_TL_Info Switch
    pointer to datagram service layer Protocol Switch
    structure, register with the protocol stack when
    the datagram service layer was installed.
```

Additional Management ECB commands for protocol stacks allow the various datagram service layers operating on top of a protocol stack to locate needed protocol information, such as a Network Identifier for the host system. The protocol stack's IOCtl ProtocolManagement function is queried with a Management ECB whose ECB_protocolID field contains the <GETNID> value (Get Network Identifiers). The access is as above but the format of information contained in ECB buffer when successful is as follows:

```
typedef struct _PS_NID_INFO_ELEMENT_ {
    UINT32                   PS_NID_ProtBoard;
    UINT32                   PS_NID_Size;
    UINT8                    PS_NID_Identifier[];
    PS_NID_INFO_ELEMENT;
where
    PS_NID_ProtBoard         Contains any internal Board
                             number that the Protocol is using,
                             -1 if unused.
    PS_NID_Size              The size of the buffer described by
                             PS_NID_Identifier. If
                             ODISTAT_OUT_OF_
                             RESOURCES is returned the field
                             ECB_DataLength contains the
                             size of the buffer required
                             to return the Network Identifier
    PS_NID_Identifier        Buffer to containing the Network
                             Identifier used by the protocol
                             to identify the host system the
                             protocol is residing on.
```

In order to enable higher level protocols (such as NCP' 502) to locate the PROTOCOL_SWITCH structure for datagram service layers (such as IP' 504), the datagram service layers register the PROTOCOL_SWITCH structure with the underlying protocol stack (such as ODI 208) when the datagram service layers are first installed. Registration of other functions and values is already part of the initialization of some protocol stacks, such as UDP's registration with IP. The underlying protocol stack provides the following API in order to accomplish this registration process. Use of an equivalent de-registration process is optional.

```
PSWSTAT    C<Protocol Name>RegisterDsLayer
                (MEON_STRING        *TLName,
                PROTOCOL_SWITCH     *TLSwitch);
    where
    TLName is a pointer to MEON_STRING (ASCJJZ) containing name
    of datagram service layer, e.g. TCP;
    TLSwitch is a pointer to datagram service layer Protocol Switch
    structure; and
    examples include CIPxRegisterDSLayer, CIPRegisterDSLayer
    functions.
```

In summary, the present invention provides a novel approach which permits the use of previously incompatible computer network protocols, such as NCP and IP, with one another without requiring tunneling, conversion, or the presence of alternative protocols. In one embodiment, NCP and IP implementations are modified such that although they present the same functionality and interface to application and ODI-level components, they now communicate directly with one another without the use of IPX or TCP.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for transmitting data between a source computer and a destination computer in a computer network, comprising the steps of:

providing a datagram service layer protocol stack at the source and providing a second datagram service layer protocol stack at the destination;

providing a connection-oriented layer protocol stack at the source and providing a second connection-oriented layer protocol stack at the destination, the datagram service layer protocol stacks and the connection-oriented layer protocol stacks on at least one of the source computer and the destination computer defining previously incompatible protocols using at least one of the following protocol pairs: an NCP protocol with an IP protocol, an SPX protocol with an IP protocol, an NCP protocol with a UDP protocol, an SPX protocol with a UDP protocol, and a TCP protocol with an IPX protocol;

registering at least a transport function of each datagram service layer protocol stack in a register;

requesting a service of the connection-oriented layer protocol stack at the source; and avoiding tunneling while servicing the request at least in part by invoking the registered transport functions.

2. The method of claim 1, wherein the connection-oriented layer protocol stack includes an NCP-compatible component.

3. The method of claim 2, wherein the requested service appears to an application program to be identical with a corresponding NCP service in a network which is not configured to operate according to said method.

4. The method of claim 1, wherein the datagram service layer protocol stack includes an IP-compatible component.

5. The method of claim 1, wherein the register resides in an ODI component.

6. The method of claim 1, wherein each connection-oriented layer protocol stack obtains an address of the registered transport function so it can call the registered function directly.

7. The method of claim 1, wherein the connection-oriented layer protocol stack on at least one of the source computer and the destination computer includes an NCP-compatible component, and the datagram service layer protocol stack on that computer includes an IP-compatible component.

8. The method of claim 7, wherein the source NCP-compatible component invokes a registered IP-compatible transport function in place of an IPX transport function.

9. The method of claim 8, wherein the requested service appears to an application program to be identical with a corresponding NCP service in a network which is not configured to operate according to said method.

10. The method of claim 8, wherein the register resides in an ODI component.

11. The method of claim 8, wherein each NCP-compatible protocol stack obtains the address of the registered IP-compatible transport function and calls the registered function directly.

12. A computer system of at least two connectable computers, each computer comprising:

a processor;

a memory accessible to the processor;

registration means for registering a transport function that transmits data in data packets which contain an IP-compatible header and which lack an IPX-compatible header, and the data packets also contain an NCP-compatible header;

invocation means for invoking the transport function; and a protocol stack containing a connection-oriented component and a datagram service component, wherein the processor, memory, registration means, invocation means, and protocol stacks provide data transmission between the two computers without protocol tunneling.

13. The system of claim 12, wherein the datagram service component is compatible with at least one of IP and UDP.

14. The system of claim 12, wherein the connection-oriented component is compatible with at least one of NCP and SPX.

15. The system of claim 12, wherein the registration means registers the memory address of an executable instruction in the transport function, and the invocation means transfers control to an instruction at that address.

16. A computer storage medium having a configuration that represents data and instructions which will cause at least a portion of a computer system to perform method steps for transmitting data, the method steps comprising the steps of claim 1.

17. The storage medium of claim 16, wherein the method steps comprise the steps of claim 7.

18. The storage medium of claim 16, wherein the method steps comprise the steps of claim 9.

19. The storage medium of claim 16, wherein the method steps comprise the steps of claim 3.

20. The storage medium of claim 16, wherein the method steps comprise the steps of claim 4.

* * * * *